United States Patent [19]

Okano

[11] Patent Number: 4,977,487
[45] Date of Patent: Dec. 11, 1990

[54] FACE BRIGHTENING DEVICE FOR USE WITH VEHICLES

[75] Inventor: Susumu Okano, Aichi, Japan

[73] Assignee: Sakae Riken Kogyo Co., Ltd., Aichi, Japan

[21] Appl. No.: 254,819

[22] Filed: Oct. 7, 1988

[30] Foreign Application Priority Data

| Oct. 9, 1987 | [JP] | Japan | 62-256085 |
| Nov. 9, 1987 | [JP] | Japan | 62-171144[U] |
| Nov. 9, 1987 | [JP] | Japan | 62-171145[U] |
| Nov. 10, 1987 | [JP] | Japan | 62-171715[U] |
| Nov. 10, 1987 | [JP] | Japan | 62-171716[U] |

[51] Int. Cl.⁵ ............................................. F21V 7/04
[52] U.S. Cl. .................................... 362/32; 362/80; 362/812; 40/547; 40/591
[58] Field of Search ................ 362/31, 32, 812, 61, 362/80; 40/546, 547, 591

[56] References Cited

U.S. PATENT DOCUMENTS

| 3,761,706 | 9/1973 | Frey | 362/32 |
| 4,128,332 | 12/1978 | Rowe | 362/32 X |
| 4,141,058 | 2/1979 | Mizohata et al. | 362/32 |
| 4,234,907 | 11/1980 | Daniel | 362/812 X |
| 4,389,698 | 6/1983 | Cibie | 362/80 X |
| 4,443,832 | 4/1984 | Kanamori et al. | 362/80 X |
| 4,561,043 | 12/1985 | Thompson | 362/812 X |
| 4,745,525 | 5/1988 | Sheehy | 362/32 |
| 4,747,648 | 5/1988 | Gilliland, III | 362/32 X |

FOREIGN PATENT DOCUMENTS

| 2315220 | 10/1973 | Fed. Rep. of Germany | 362/32 |
| 2703525 | 8/1978 | Fed. Rep. of Germany | 40/547 |

Primary Examiner—Stephen F. Husar
Attorney, Agent, or Firm—Larson and Taylor

[57] ABSTRACT

A face brightening device for use with vehicles comprising optical fibers and a light source wherein the light source is attached to one or both ends of the optical fibers to brighten those notched faces of the optical fibers which form letters, patterns, brightening faces and the like needed inside and outside the vehicles. The face brightening device can be made smaller in size, simpler in construction, lighter in weight, more saving in space, and much more excellent in water-proofness, heat-resistance, weather- proofness and insulation.

12 Claims, 19 Drawing Sheets

FIG. 15a
FIG. 15b
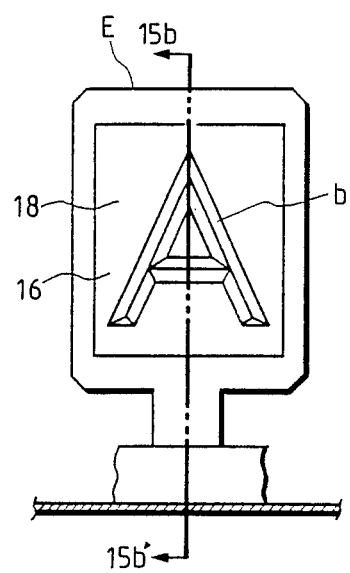
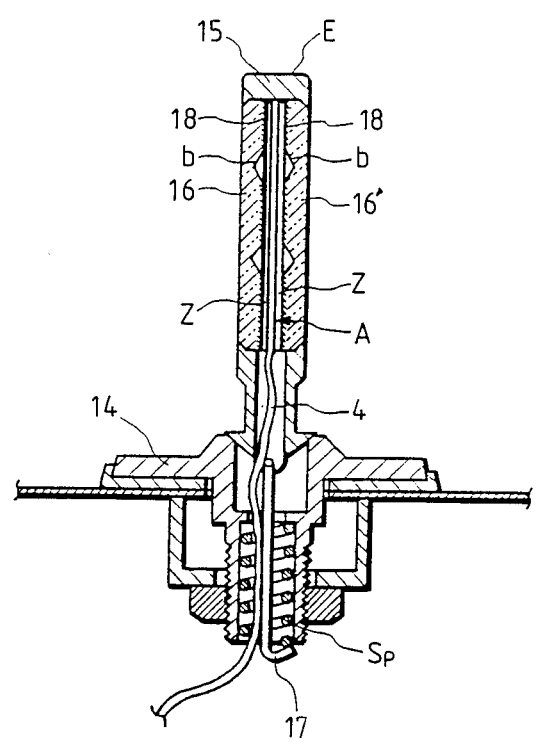

FACE BRIGHTENING DEVICE FOR USE WITH VEHICLES

BACKGROUND OF THE INVENTION

Various kinds of brightening faces are arranged inside and outside a vehicle to achieve functional, safety and decorative objects.

Head lamps, tail lamps, emblem and the like form brightening faces outside the vehicle while meters in front of the driver's seat are brightened inside the vehicle.

In the case of a rear panel garnish (a) arranged at the back of a car ($C_1$) and shown in FIG. 1, light emitting members (d) and (d') are attached to a transparent piece (c) whose thickness ($t_l$) is substantially large and then fixed to the car frame by a plate (e), so that letters (b) can be brightened and displayed.

Rear combination lamps (f) and (f') of a car ($C_2$) shown in FIG. 2a are relatively too large in thickness ($t_2$) and the space in which the rear combination lamps are housed is also quite large in thickness ($t_3$) relative to the size of the car body.

The reason why the space in which these rear combination lamps are housed becomes too large in thickness is that sufficient room is needed for the light emitting members such as electric light bulbs which serve as light sources, their wirings and a space in which these members and wirings are housed. When the tendency to make the cars smaller in size and lighter in weight is dominant, therefore, an improvement must be added to these combination lamps. The size and weight of other various parts which are brightened must also be improved.

Each of the rear combination lamps (f) and (f') which must be brought under legal rules and brightened as decorations is made as a unit comprising a brake lamp ($m_1$), tail lamp ($m_2$), traffic indicator or blinker ($m_3$) and emergency lamp ($m_4$), as shown in FIG. 2b, and these components take up a large space, thereby reducing the size of trunk room at the back of the car.

FIG. 2c is a sectional view showing the rear combination lamp (f) or (f') in FIG. 2b and when the lamp becomes complicated in construction, its thickness ($t_4$) ranges even from 100 mm to 180 mm because a filament bulb (w) attached to a lamp body (D) must have a certain distance relative to a lens (R) to uniformly brighten the lens (R). Even when the lamp is designed like this, however, the lens (R) cannot be brightened as a uniformly light-emitting face.

The inside space (s) of the rear combination lamp (f) or (f') must be sealed in view of electric insulation.

These factors prevent complicated designs from being applied to the rear combination lamp (f) or (f') and even when complicated designs could be applied to the lamp, it will become substantially expensive.

As already well known from preliminarily-opened Japanese Patent Application Sho 58/110332 and Japanese Utility Model Application Sho 60/13052, EL (electroluminescence) or LED is used as a light source to brighten decorative matters, but when EL is used, voltage needed becomes high in proportion to the size of a face to be brightened. In addition, an inverter is needed to switch voltage from DC to AC. When LED is used, a large space is needed to house the LED lamp. In both cases, however, their wirings must be compacted in a space as small as possible, thereby compromising the safety of these decorative matters.

The conventional front grille was made by sputtering, plating, or coating opaque synthetic resin with a design. As shown in FIG. 3, the front grille (F) plays the most important role in designing a car ($C_3$) and it is desirable that the front grille is made integral to the body of the car. It is also desirable in view of aerodynamic design that the front grille be made integral with the headlights. Because the recent car body is made flush and provided with glass faces, a transparent crystal front grille is employed. However, the design merit of making the front grille of transparent material is only three-dimensional and too simple, as compared with the design merit of making the front grille by sputtering, plating or coating opaque synthetic resin. The front grille looks gloomy particularly at the twilight and in the night because it has no metal surface which reflects light.

FIGS. 4a and 4b show an indicator ($Y_1$) for the transmission change gear lever in the conventional automatic car wherein a filament bulb (w) is fixed to an indicator body ($Y_2$) to light the underside of a display housing (H) so that letters P, R, N, D, 2 and L on a display (B) can be lit with same brightness and color tone. Symbol (S) represents a slider sliding in the longitudinal direction thereof and the change gear lever (not shown) is passed through a hole (g) in the center of the slider (S) and a slit (g') in the display housing (H). When the transmission change gear lever is switched, one of the letters (b) is brightened red through a transparent mark (M), showing the position of the transmission change gear lever. As shown in FIG. 4a, the position of the change gear lever in the automatic car is usually displayed by the letters of P, R, N, D, 2 and L, and P, R, D, 2 and L of them are white in tone while N is green in tone. These letters are made so bright that the driver can see them, particularly in the night, and they must have the same brightness and color tone.

As shown in FIG. 4b, however, those distances of the filament bulb (w) which are relative to the letters are different, so that the letters cannot be lit with same brightness and color tone. To overcome this problem, the letters must be silk-printed thicker and thicker as they come nearer to the filament bulb (w). However, these silk-printing and coating cause more and more errors and include more and more processes as they are repeated.

SUMMARY OF THE INVENTION

The present invention relates to a face-brightening device for use inside and outside the vehicles.

The face-brightening device comprises optical fibers wherein the optical fibers are notched at their intended portions and a light source is attached to their one or both ends to brighten their intended notched portions.

An object of the present invention is to provide a face-brightening device comprising optical fibers wherein light introduced from a light source into the optical fibers is emitted through notched portions of the optical fibers to emerge as letters, patterns or the like, whereby light brightening faces are excellent in water-proofness, heat-resistance, weather-proofness and insulation can be formed with lighter weight and smaller space inside and outside the vehicles.

Another object of the present invention is to provide illuminating lamps such as the rear combination lamp which can have uniformly brightening faces and which can be safely used in a smaller space.

A further object of the present invention is to provide an emblem or top mark which can have uniformly brightening faces and which can be safely and spacesavingly used for vehicles.

A still further object of the present invention is to provide a front grille and a rear panel for use with vehicles which can be excellent in design and which can be beautifully brightened, particularly in the night.

A still further object of the present invention is to provide an indicator for the transmission change gear lever in vehicles capable of uniformly brightening letters on the display of the display housing by means of optical fibers.

These and other objects of the present invention can be achieved by a face-brightening device for use with vehicles and some examples of the face brightening device will be described in detail with reference to the accompanying drawings.

It should be understood that various changes and modifications be made without departing the spirit and scope of the present invention and will be included in claims appended hereto.

BRIEF DESCRIPTION OF THE DRAWINGS

FIG. 4a shows the indicator dismantled.

FIG. 4b is a sectional view taken along a line 4b –4b' in FIG. 4a.

FIG. 5b is an enlarged sectional view taken along a line 5b–5b' in FIG. 5a.

FIG. 6b is a sectional view taken along a line 6b –6b' in FIG. 6a.

FIG. 6c is a sectional view taken along a line 6c –6c' in FIG. 6a.

FIG. 8b is an enlarged sectional view taken along a line 8b–9b' in FIG. 8a.

FIG. 15a is a front view showing a hood ornament to which the face brightening device of the present invention is applied.

FIG. 15b is a sectional view taken along a line 15b–15b' in FIG. 15a.

FIG. 19b is a sectional view taken along a line 19b–19b' in FIG. 19a.

FIG. 20b is a sectional view taken along a line 20b–20b' in FIG. 20a.

FIG. 21c is an enlarged sectional view taken along a line 21c–21c' in FIG. 21a.

FIG. 22b is a sectional view taken along a line 22b–22b'0 in FIG. 22a.

DETAILED DESCRIPTION OF THE PREFERRED EMBODIMENTS

Figure 1:
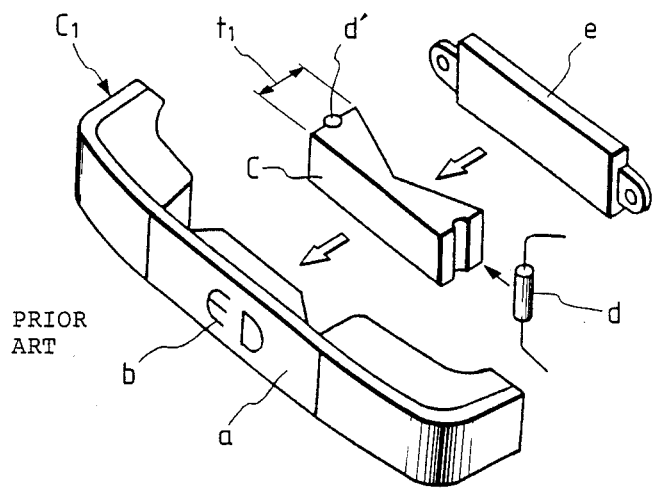
FIG. 1 is a perspective view showing the display section at the back of the conventional vehicle dismantled.
Figure 2A:
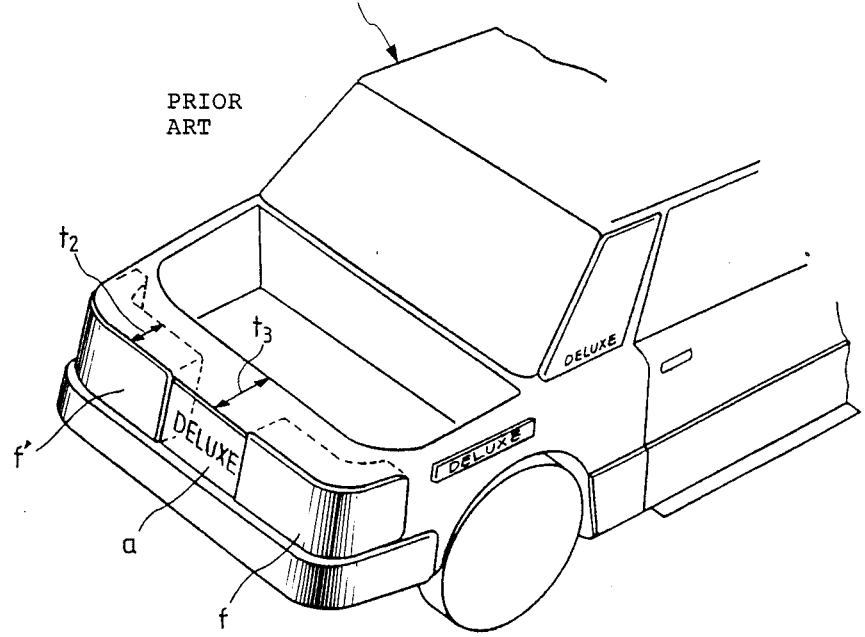
FIG. 2a is a perspective view showing the display section at the back of the conventional vehicle.
Figure 2B:
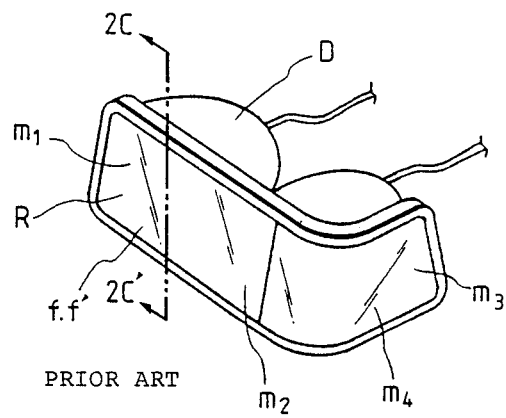
FIG. 2b is a perspective view showing the conventional rear combination lamp.
Figure 2C:
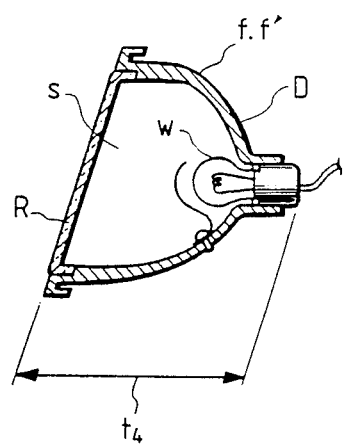
FIG. 2c is a sectional view taken along a line 2c 2c' in FIG. 2b.
Figure 3:
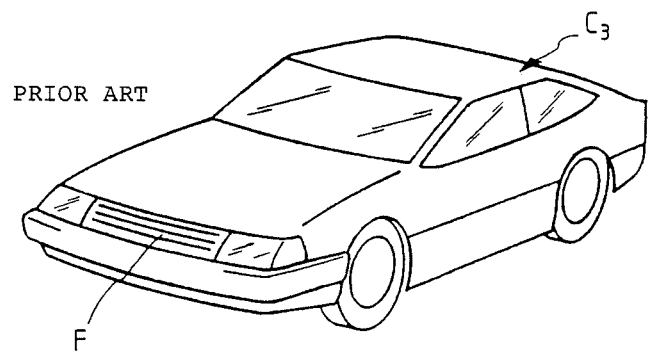
FIG. 3 shows a front grille of the conventional car.
Figure 4A:
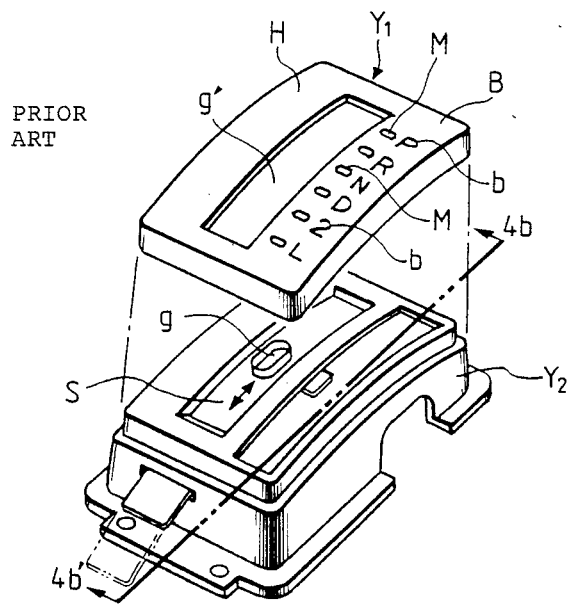
FIG. 4a is a perspective view showing an indicator for the change gear lever in the conventional automatic car.
Figure 4B:
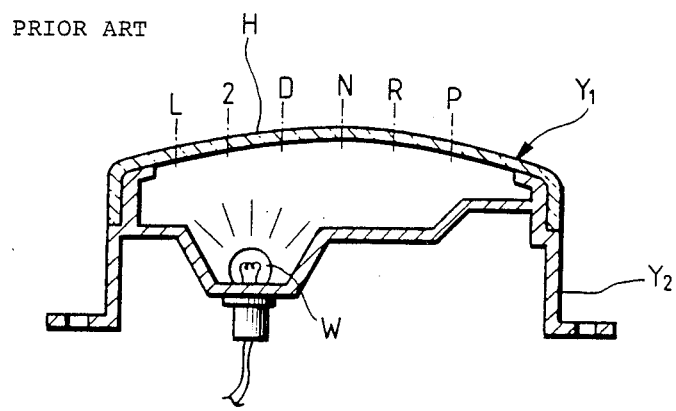
Figure 5A:
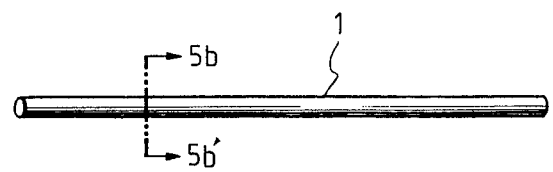
FIG. 5a is a perspective view showing an optical fiber enlarged.

As shown in FIG. 5a, an optical fiber 1 having a diameter of 0.1–3.0φ is usually used but its diameter may be larger according to its brightness which it is expected to be achieved and also according to its arrangement when it is used to assemble a face brightening device. A light source for the optical fibers 1 is located at a position different from those of the filament bulbs for the rear combination lamps (f) and (f') and light emitted from the light source is introduced into the optical fibers 1 through another optical fiber or the like.

Figure 5B:
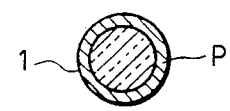

As shown in FIG. 5b, the optical fiber 1 is made by coating a synthetic resin of the fluorine group around layers of a transparent synthetic resin so as to reduce light leakage as much as possible.

Figure 5C:
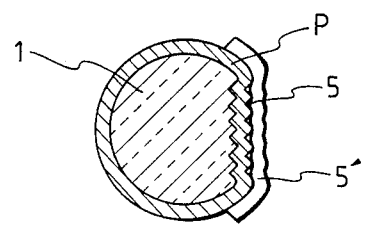
FIG. 5c is an enlarged sectional view, similar to FIG. 5b, showing a variation of the optical fiber shown in FIG. 5b.

The optical fiber 1 has a portion to be brightened and another portion extending to the light source. The portion of the optical fiber 1 which is to be brightened is notched at the backside thereof, as shown in FIG. 5c. When a fluorescent paint 5' is coated on this notched portion of the optical fiber 1, the brightness of its notched portion can be made high.

Figure 6A:
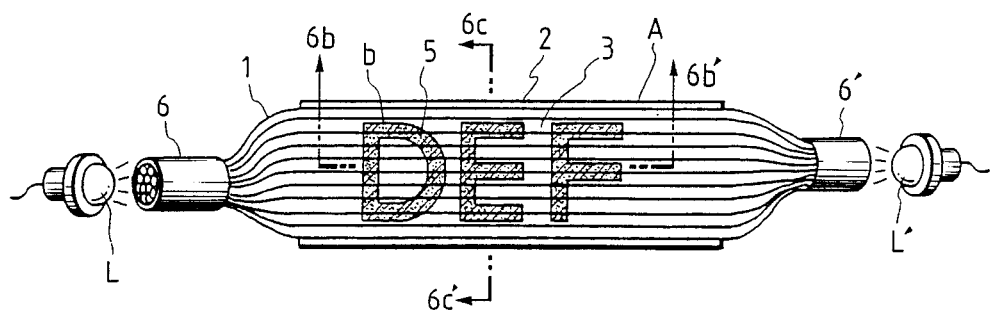
FIG. 6a is a front view showing a face brightening device of the present invention.

FIG. 6a shows a face brightening device (A) comprising the optical fibers 1 wherein a plurality of the optical fibers 1 are fixed side by side on a base film 2 made of synthetic resin to form a brightening section 3. The thickness of this brightening section 3 ranges from 0.1 mm to 1.5 mm. The optical fibers 1 are notched at their brightening section 3 to draw letters (b) by their notched portions 5. Light sources (L) and (L') are arranged to 0 face terminals 6 and 6', respectively, which bundle both ends of the optical fibers 1. When the light sources (L) and (L') are switched on, light emitted from the light sources passes through the terminals 6 and 6' and advances through the optical fibers 1 while it is irregularly reflected by the notched portions 5 at the brightening section 3 of the optical fibers 1 to brighten the letters (b).

The notched pattern of the notched portions 5 is adjusted to brighten the letters (b) at the brightening section 3 to a desired extent. More specifically, the reflection (or reflection and refraction) factor of light at the notched portions 5 of the optical fibers 1 is made larger and larger as the notched portions 5 depart from the light source (L) or (L') further and further. The brightness of the whole brightening section 3 can be freely adjusted by adjusting the light emitting capacity of the light sources (L) and (L').

Figure 6B:
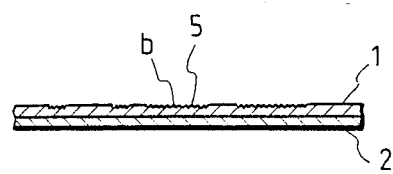
Figure 6C:
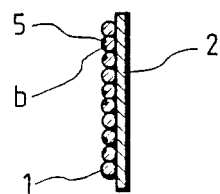

FIG. 6b is a sectional view taken along a line 6b–6b' in FIG. 6a and FIG. 6c is also a sectional view taken along a line 6c–6c' in FIG. 6a, which show that the optical fibers 1 are positioned on the base film 2 and that those portions 5 of the optical fibers 1 which represent the letters (b) are notched. Those backsides of the optical fibers 1 which correspond to the notched portions 5 may be notched instead of the notched portions 5, as shown in FIG. 5c.

Figure 6D:
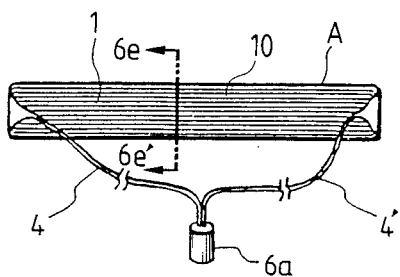
FIG. 6d is a perspective view showing another example of the face brightening device according to the present invention.

In FIG. 6d, the optical fibers 1 are arranged side by side and fixed together to form a flat portion 10. The optical fibers 1 are bundled at both ends of the flat portion 10 to form two bundles 4 and 4' of the optical fibers 1, which are connected to a coupler 6a. Those portions of the optical fibers 1 which are to be brightened are notched at the backside of the flat portion 10 to form notched portions 5.

Figure 6E:
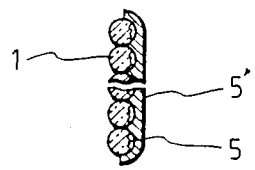
FIG. 6e is an enlarged sectional view taken along a line 6e–6e' in FIG. 6d.

FIG. 6e shows the section of the flat portion 10 in FIG. 6d and when the notched portions 5 are coated with a fluorescent paint 5', their brightness can be enhanced.

Figure 6F:
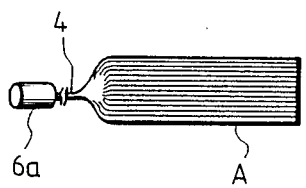
FIG. 6f is a perspective view showing a further example of the face brightening device according to the present invention.

FIG. 6f shows a face brightening device (A) provided with a coupler 6a only at one end thereof.

Figure 6G:
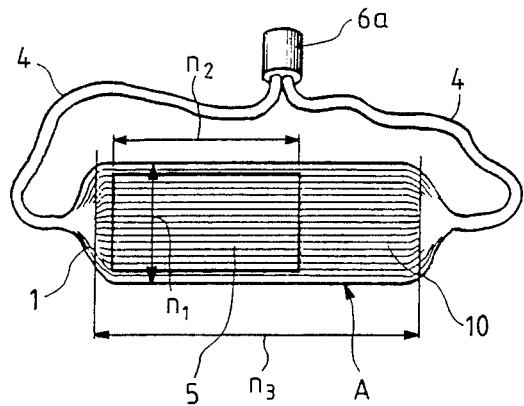
FIG. 6g is a perspective view showing a still further example of the face brightening device according to the present invention.

FIG. 6g shows a variation of the face brightening device wherein the optical fibers 1 are arranged side by side and fixed together to form a flat portion 10 having an area ($n_1$ by $n_3$) enough to correspond to a brightening portion ($n_1$ by $n_2$) and a margin needed to attach the face brightening device to a certain place.

Figure 6H:
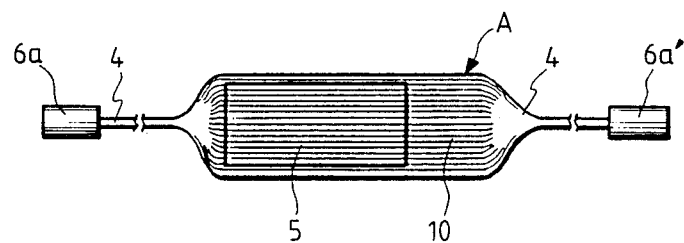
FIG. 6h is a front view showing a still further example of the face brightening device according to the present invention.

FIG. 6h shows another variation of the face brightening device wherein two couplers 6a and 6a' are connected to both ends of bundled optical fibers 1, respectively.

A notched portion 5 is formed on the front or back side of the flat portion 10, corresponding to the brightening portion ($n_1$ by $n_2$) in FIGS. 6g and 6h.

Figure 7A:
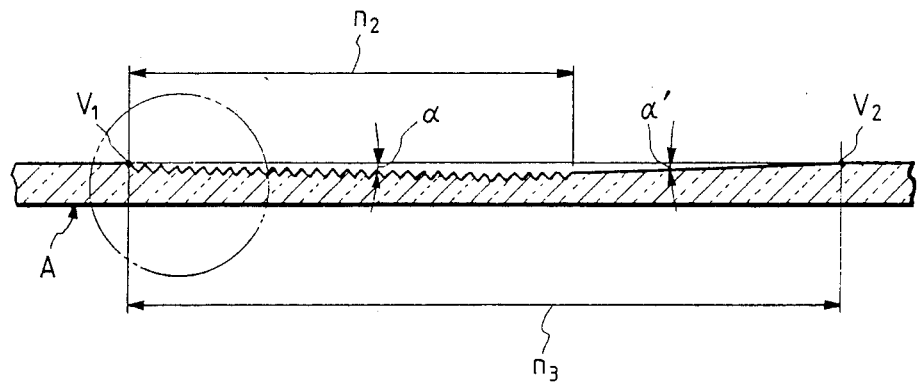
FIG. 7a shows how the optical fiber is notched.
Figure 7B:
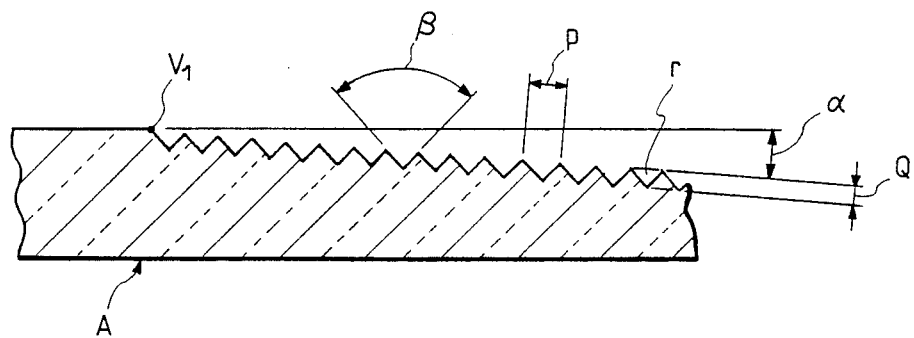
FIG. 7b shows a part of the optical fiber enlarged.

The manner of notching the optical fiber 1 to form the notched portion 5 will be described with reference to FIGS. 7a and 7b. The flat portion 10 including the area ($n_1$ by $n_2$) to be brightened in FIG. 6g is tilted by angles α and α' along a center line extending in the longitudinal direction of the area ($n_1$ by $n_2$) and between an outermost point ($V_1$) of the area and another outermost point ($V_2$) of the margin and recesses (r) each having a certain depth are formed on the optical fibers 1 at the area ($n_1$ by $n_2$), adjusting their angle β and pitch (p). This manner of notching the optical fibers 1 is carried out in such a way that a press on which the recesses (r) are formed with such shape, angle β and depth as meet the brightness of the area to be brightened is pushed against the optical fibers 1 with heat and pressure.

Figure 8A:
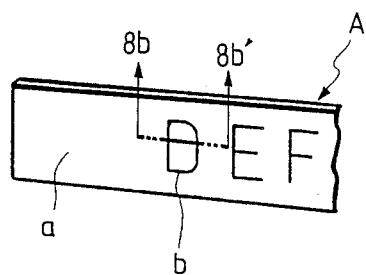
FIG. 8a is a perspective view showing the face brightening device of the present invention used as a rear panel of the car.
Figure 8B:
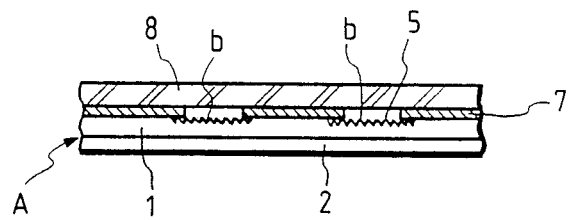

FIG. 8a shows the face brightening device used as a rear panel garnish (a) of the car wherein a layer of opaque ink 7 covers the optical fibers 1 except the notched portions thereof which represent the letters (b) and a transparent panel 8 is placed thereon, as shown in FIG. 8b. The notched portions 5 on the optical fibers 1 may be formed on those backsides of the optical fibers 1 which correspond to the letters (b).

Letters, patterns or the like can be brightened at the brightening face and when the brightening face is notched all over it, it can be brightened as a face.

Figure 9:
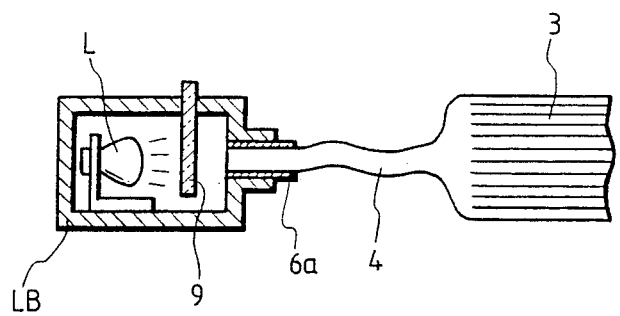
FIG. 9 is a sectional view showing a light source attached to one ends of optical fibers.

Light can be introduced from the light source for the head lamps, rear back lamps or the like into the optical fibers 1 through the bundled portion of the optical fibers, as described above. Or a light emitting box (LB) may be used as the light source, as shown in FIG. 9 and when a color filter 9 is arranged between a light source (L) and the bundled portion 4 of the optical fibers 1, the color of light can be freely selected.

Figure 10:
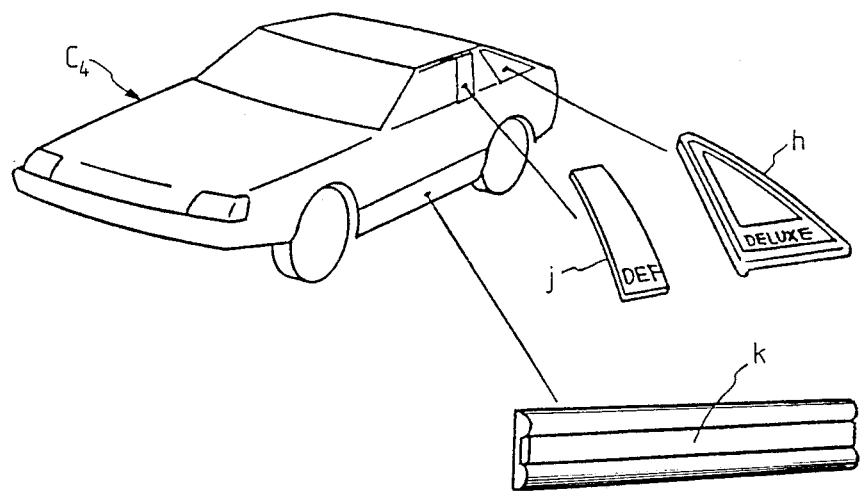
FIG. 10 shows to which parts of the car the face brightening device of the present invention is applied.

FIG. 10 shows to which parts of a car ($C_4$) the face brightening device of the present invention can be applied, except the rear panel garnish (a). When the face brightening device is applied to the quarter window garnish (h), center pillar garnish (j), side protector mold (k), step plate, bumper mold, inside of the trunk room and the like, letters, patterns or the like can be brightened at these parts.

Figure 11A:
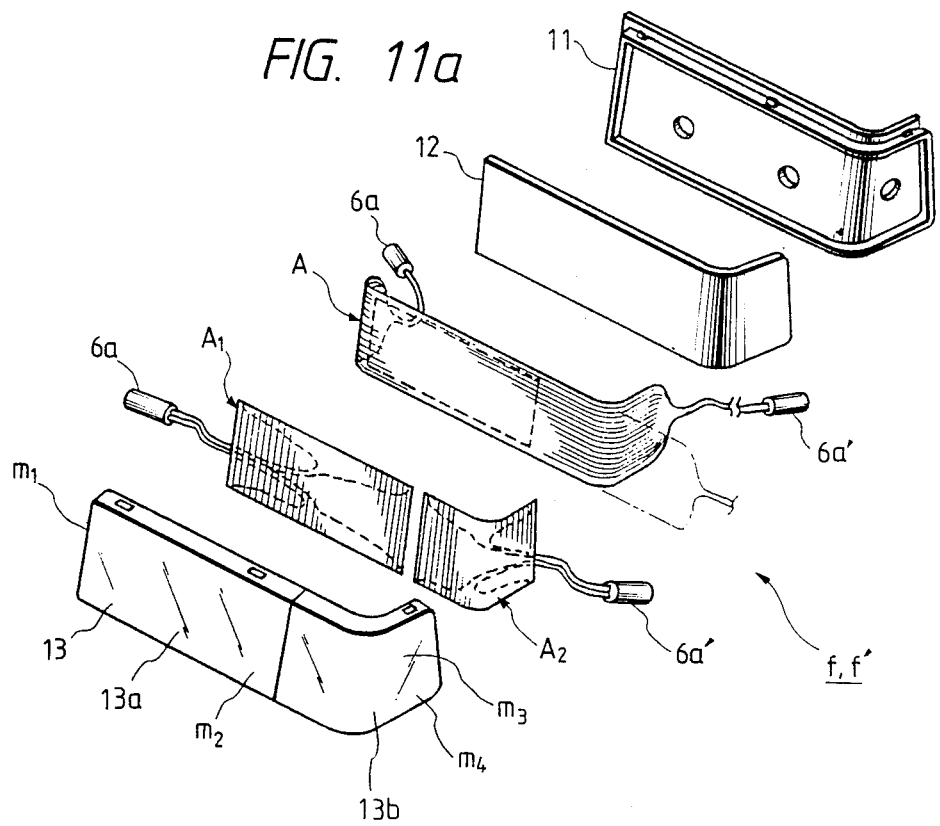
FIG. 11a is a perspective view showing a rear combination lamp to which the present invention is applied and which is dismantled.

FIG. 11a shows face brightening devices (A), ($A_1$) and ($A_2$) combined with one another to form a rear combination lamp (f) or (f'). The face brightening device (A) is fixed to a reflector plate 12 along the curved front face thereof which has such a shape as can be along the front face of a lamp body 11 and which is made, 0.5 mm thick, by vacuum-molding white synthetic resin, and the face brightening devices ($A_1$) and ($A_2$) are further fixed to the face brightening device (A). These reflector plate and face brightening devices may be fixed to one another by means of transparent adhesive or transparent two sided adhesive tape. The face brightening devices (A), ($A_1$) and ($A_2$) thus assembled with the reflector plate 12 are fixed to the lamp body 11 and couplers 6a and 6a' for connecting the face brightening devices to their light sources are extended outside the lamp body through coupler holes. A transparent colored lens 13 is then attached to the lamp body 11 to form the rear combination lamp (f) or (f'). The transparent colored lens 13 in FIG. 11a comprises a red lens 13a and an orange-colored lens 13b.

When the light source for the face brightening device (A) is switched on, a tail lamp ($m_1$) is turned on. When the light source for the face brightening device ($A_1$) is switched on, associating with the brake pedal, a brake lamp ($m_2$) is lit. When the light source for the face brightening device ($A_2$) is switched on, a traffic indicator or blinker ($m_3$) is turned on. When the light source for the face brightening device ($A_2$) is used for emergency flashing display and switched on at the time of emergency, an emergency lamp ($m_4$) flashes.

Figure 11B:
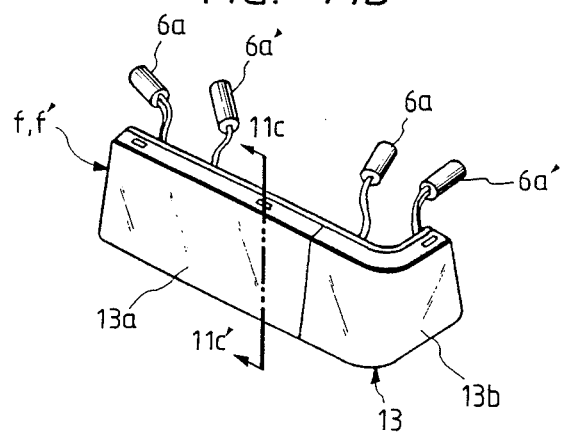
FIG. 11b is a perspective view showing how the rear combination lamp to which the present invention is applied is assembled.
Figure 11C:
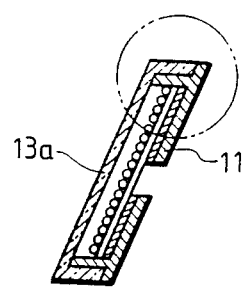
FIG. 11c is an enlarged sectional view taken along a line 11c–11c' in FIG. 11b.
Figure 11D:
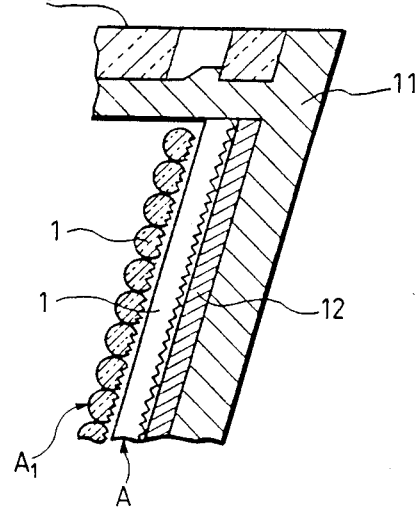
FIG. 11d shows a part of the rear combination lamp in FIG. 11c enlarged.

FIG. 11b shows the rear combination lamp (f) or (f') assembled as described above, FIG. 11c is a sectional view taken along a line 11c–11c' in FIG. 11b and FIG. 11d shows on an enlarged scale a part of the lamp enclosed by a two-dot and dash line in FIG. 11c. The face brightening device (A) fixed to the front face of the reflector plate 12 is placed on the front face of the lamp body 11 and the face brightening device ($A_1$) is further placed on the front face of the face brightening device (A).

When the light source for the face brightening device (A) is switched on, light which brightens the notched flat portion of the optical fibers in the face brightening device (A) is reflected toward the red lens 13a through the notched flat portion of the optical fibers in the face brightening device ($A_1$) by means of the reflector plate 12. When the face brightening device ($A_1$) is further switched on, light which brightens the notched flat portion of the optical fibers in the face brightening device ($A_1$) is also reflected toward the red lens 13a, so that the brightness of the red lens 13a can be a sum of those of the notched flat portions of the optical fibers in the face brightening devices (A) and ($A_1$). When the optical fibers in the one face brightening device are arranged side by side in the vertical direction in the case where the notched flat portions of the optical fibers in both face brightening devices (A) and ($A_1$) are brightened, the optical fibers in the other face brightening device may be arranged side by side in the traverse direction.

Figure 12:
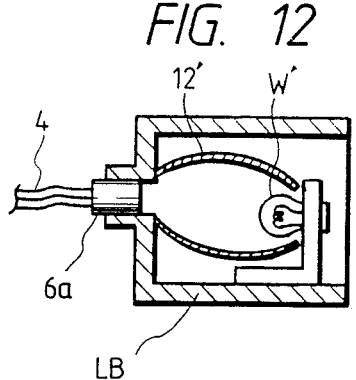
FIG. 12 is a sectional view showing another light source connected to the optical fibers.

FIG. 12 shows an example of the light emitting box (LB) wherein light emitted from a halogen lamp (w') is reflected toward a coupler 6a by a reflector plate 12'.

Figure 13:
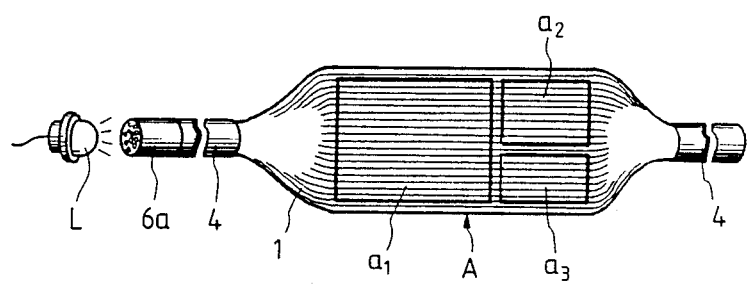
FIG. 13 is a perspective view showing a still further example of the face brightening device according to the present invention.

The depth of the recesses (r) on the flat portion of the optical fibers in the face brightening device (A) is made large at a zone ($a_1$) in FIG. 13 which must be strongly brightened as the brake lamp and their angle $\beta$ is also adjusted accordingly. Their depth, however, is made small at a zone ($a_2$) which may be less strongly brightened as the lamp for showing the car width and their angle $\beta$ is adjusted accordingly. A zone ($a_3$) is brightened as the back lamp. The brightness of the lamps can be adjusted in this manner, using the same light source and the same flat portion of the optical fibers in the face brightening device (A). This enables the rear combination lamp to be made extremely thin to save space. In addition, the light source can be positioned remote from the rear combination lamp and this enables the flat portion of the optical fibers in the face brightening device to be kept free from heat created by the light source and any of the light sources in the car to be used as the one for the rear combination lamp.

The rear combination lamp should preferably uniformly brighten its front face. It is therefore a more remarkable improvement of the present invention, as compared with the conventional combination lamp whose brightness is not uniform depending upon how the filament bulb (w) is positioned relative to the lens of the lamp, that the lamp of the present invention can be uniformly brightened and that its brightness can be freely adjusted according to what purpose it is used for.

The face brightening device of the present invention can be extremely thin, light in weight and freely flexible and used as functional, decorative and on safety parts inside and outside the car. It can thus save space for the car and make the car light in weight and it is excellent in water-proofness, heatresistance and weather-proofness. Further, it can use any of the light sources in the car.

The light source for the face brightening device of the present invention can be located remote from the device. When the device is used as pieces for decorating the outside of the car, therefore, they can be safe without keeping them waterproof. Further, they can be protected from fire caused by a short circuit.

It is a long-range necessity that space in the car should be saved to make the driver freer in the car. The face brightening device of the present invention can be used in an extremely small space and this enables the space in the car to be effectively used.

The above-mentioned merits of the present invention contribute to making reasonable and economical cars.

The rear combination lamp is legally desired to pay attention to safety and have a certain and uniform brightness on all of its front lens. When the face brightening device of the present invention, which is flexible enough to easily meet any complicated curves, is used as the rear combination lamp, the distance between the lens and the notched portions of the optical fibers can be kept certain. In addition, the diameter of the optical fibers, design of patterns formed by the notched portion of the optical fibers, angle and depth of the notches (or recesses) on the optical fibers, light source, means for connecting the coupler and the optical fibers, and fluorescent (or reflective) paint coated on the notched portion of the optical fibers can be freely selected according to the brightness which the rear combination lamp is asked to have. This enables the rear combination lamp to be uniformly brightened and to be a space-saving and economical car lamp.

Figure 14:
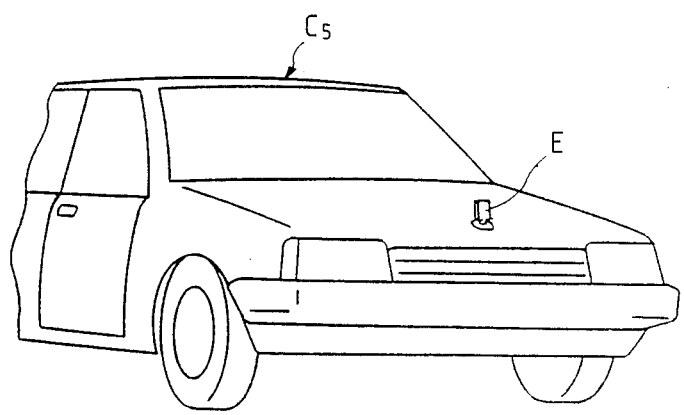
FIG. 14 shows a hood ornament of the car.

Symbol (E) in FIG. 14 represents a hood ornament or emblem of a car ($C_5$). FIG. 15a shows the emblem (E) in detail and FIG. 15b is a sectional view taken along a line 15b–15b' in FIG. 15a.

A frame 15 is fixed to a mount 14 by means of a spring (sp) and a holding wire 17 and transparent emblem plates 16 and 16' are fitted into the frame 15. The flat portion 10 of the optical fibers 1 in the face brightening device (A) is located between the emblem plates 16 and 16' by means of a adhesive medium such as transparent adhesive or two sided adhesive tape and the optical fibers 1 are bundled at one end thereof and lead to a light source (L) which is not shown.

The transparent emblem plates 16 and 16' are made opaque by silk printing or thin metal film, for example, except those portions thereof which correspond to a letter or pattern (b). In other words, their portions which correspond to the letter or pattern (b) are left transparent to allow light to pass therethrough while their remaining portions are made opaque not to allow light to pass therethrough.

Figure 16:
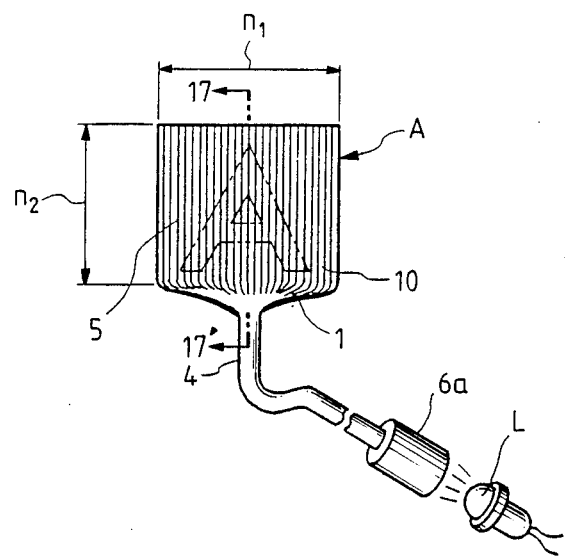
FIG. 16 is a front view showing the face brightening device of the present invention used as the hood ornament.

As shown in FIG. 16, a plurality of the optical fibers 1 are arranged side by side in a certain width and fixed together by transparent adhesive to form a flat portion 10. The optical fibers 1 are bundled at one end of their flat portion and the bundled optical fibers are extended and connected to a coupler 6a which is fixed to a light source (L). The optical fibers 1 may be bundled at both ends of their flat portion and connected to couplers 6a and 6a' (see FIG. 6h ) or a coupler 6a (see FIG. 6d ). The head lamp, for example, can be used as the light source introduced into the flat portion 10 of the optical fibers 1. When the head lamp is used like this, the face brightening device which is used as the emblem does not need its own light source and it makes it easy to check the burn-out of the head lamp.

Figure 17:
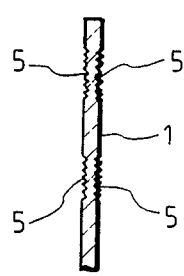
FIG. 17 is an enlarged sectional view taken along a line 17-17' in FIG. 16.
Figure 18:
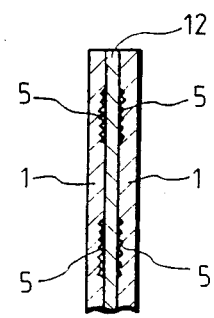
FIG. 18 is an enlarged sectional view, similar to FIG. 17, showing a variation of the hood ornament.

As shown in FIG. 17, both sides of the optical fibers 1 may be notched to emit light through both sides thereof. Or as shown in FIG. 18, the optical fibers 1 may be fixed to both sides of a reflector plate 12 (mirror or white plate) by means of transparent adhesive. Needless to say, the optical fibers 1 are previously notched on their one side in this case to form notched portions 5.

As apparent from the above, the face brightening device of the present invention make it possible to provide a space-saving, safe and low-cost emblem. This emblem is space-saving because its light source can be located in any desired space remote from it. In addition, short circuit is not caused even when water should enter into it.

Figure 19A:
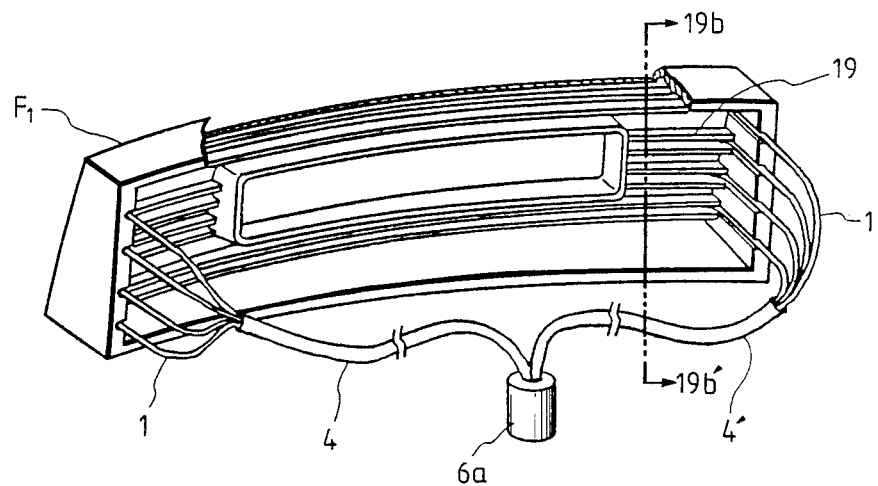
FIG. 19a is a perspective view showing the backside of a front grille to which the face brightening device of the present invention is applied.
Figure 19B:
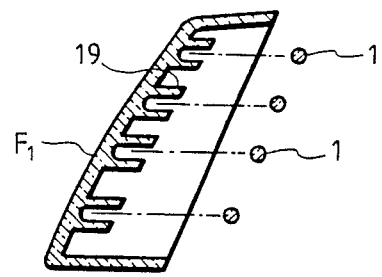

FIGS. 19a and 19b show the face brightening device of the present invention applied to a front grille (F₁) wherein an optical fiber 1 which is notched over a necessary length is fixed to each of grooves 19 on the backside of the front grille (F₁) and they are bundled at both ends of the front grille (F₁) to form bundled portions 4 and 4' connected to a coupler 6a.

Figure 20A:
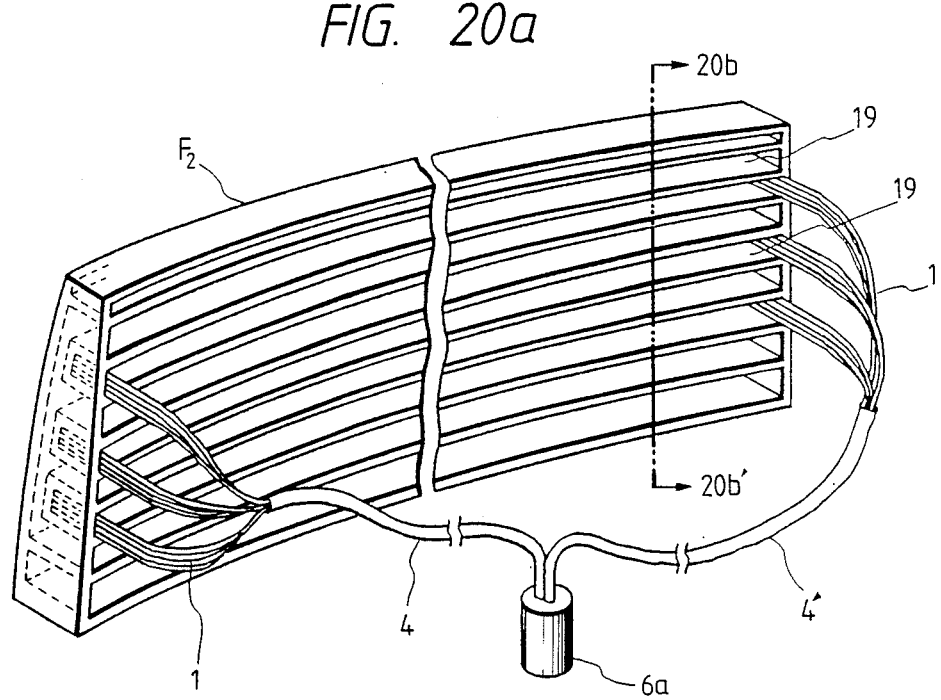
FIG. 20a is a perspective view showing the backside of another front grille to which the face brightening device of the present invention is applied.
Figure 20B:
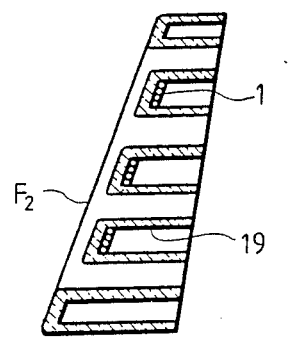

FIGS. 20a and 20b also show the face brightening device of the present invention applied to a front grille (F₂) wherein plural optical fibers 1 are arranged in each of grooves 19 on the backside of the front grille (F₂) and bundled at both ends of the front grille to form bundled portions 4 and 4' connected to a coupler 6a. The coupler 6a is connected to a light source which can be located at any desired safe position to save space for the car, and when the light source is switched on, light is introduced into the optical fibers 1 to brighten their notched portions, so that the front grille (F₂) can be brightened in the night.

The optical fiber 1 is so flexible as to easily follow any curves such as those of the front grilles (F₁) and (F₂).

Figure 21A:
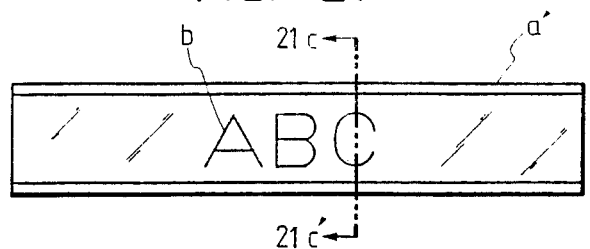
FIG. 21a is a front view showing a rear panel to which the face brightening device of the present invention is applied.
Figure 21B:
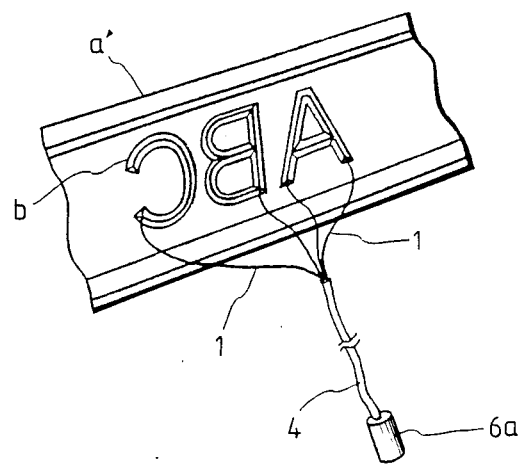
FIG. 21b is a perspective view showing the backside of the rear panel enlarged.
Figure 21C:
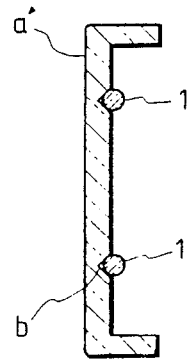

FIG. 21a shows the face brightening device of the present invention applied to a rear panel (a') to brighten letters (b) thereon. In FIG. 21b , the optical fibers 1 are arranged to follow the letters (b) and those portions of the light fibers which correspond to the letters (b) are previously notched to brighten the letters (b). FIG. 21c is a sectional view taken along a line 21c–21c' in FIG. 21a.

When the face brightening device of the present invention which comprises optical fibers having notched portions is to be brightened to any desired extent, a coupler or couplers to which the bundled portion or portions of the optical fibers are connected, and a light source to which the couplers are connected is attached to the inside of transparent parts such as the front grille and rear panel, the front grille, rear panel and the like can be brightened from inside to make the car body prominent. The face brightening device can also be applied to the other decorative parts of the car such as the side protector.

Figure 22A:
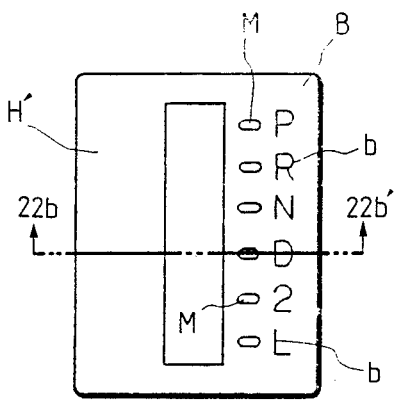
FIG. 22a is a plan showing an indicator for the transmission change gear lever to which the face brightening device of the present invention is applied.
Figure 22B:
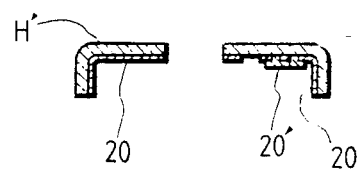

FIGS. 22a and 22b show the face brightening device of the present invention applied to an indicator for the transmission change gear lever in the car wherein the underside of a display housing (H') is once coated by opaque paint (20) and then once coated by green or white paint (20'), as shown in FIG. 22b, and the flat portion of the optical fibers are fixed to the underside of a display (B) on the thus-coated display housing (H') to uniformly brighten the display (B) with same brightness and tone color.

Figure 23:
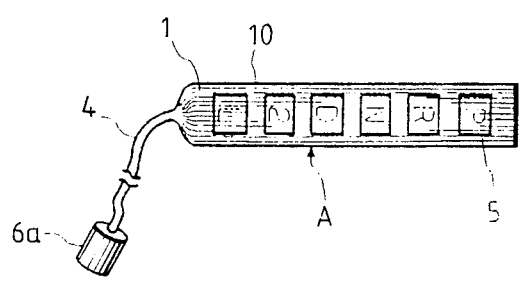
FIG. 23 is a perspective view showing the face brightening device of the present invention used as the indicator for the transmission change gear lever.

The optical fibers 1 are arranged side by side and fixed together to form a flat area 10 and then bundled at one end of the flat area to form a bundled portion 4 which is extended to a light source, as shown in FIG. 23. Those portions of the optical fibers 1 at their flat area 10 which correspond to letters P, R, N, D and L in this case are notched to form notched portions 5. Brightness at the notched portions becomes smaller and smaller as the notched portions depart from the light source further and further. Therefore, notches or grooves on the optical fibers at the flat area thereof are made deeper and deeper or the angle of these notches or grooves is made smaller and smaller as the notched portions depart from the light source further and further. This manner of notching the optical fibers is carried out by heating and pressing the optical fibers, as described above (see FIGS. 7a and 7b).

When bundled portions 4 and 4' of the optical fibers 1 which are formed at both ends of the flat area 10 are connected to a coupler 6a (see FIG. 6d ), brightness will become about two times stronger, as compared with this indicator for the change gear lever shown in FIG. 23.

Figure 24A:
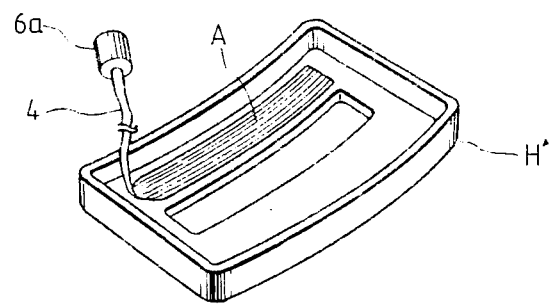
FIG. 24a is a perspective view showing the backside of a display housing for the indicator.

As shown in FIG. 24a, the flat area 10 of the optical fibers 1 thus notched is fixed to the underside of the display housing (H') by transparent adhesive or two-sided adhesive tape, positioning its notched portions at the letters, respectively.

Figure 24B:
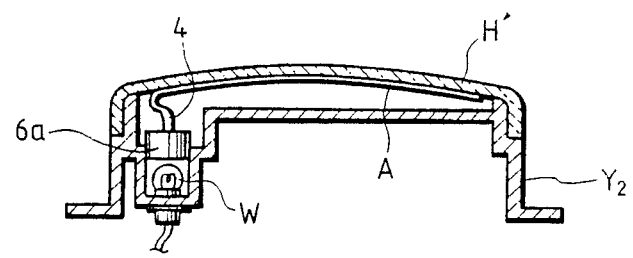
FIG. 24b is a sectional view showing the indicator for the change gear lever.

FIG. 24b shows the display housing (H') attached to an indicator body (Y₂). A filament bulb (w) can be positioned to save space because the bundled portion 4 of the optical fibers 1 can be extended to any desired length.

When the face brightening device of the present invention is applied to the indicator for the transmission change gear lever, as described above, the letters on the display of the display housing can be brightened with same brightness and color tone. In addition, space can be saved.

What is claimed:

1. A face brightening device for use with vehicles wherein a plurality of transparent optical fibers are: arranged side by side in a certain width; fixed together on a base film of synthetic resin to form a flat area and notched at their flat area to form light-emitting portions which represent letters, patterns or the like; and bundled together at both ends thereof with the bundled ends each connected to a light source.

2. A face brightening device for use with vehicles according to claim 1, wherein the device is a hood ornament comprising a plurality of optical fibers arranged side by side, notched to have the desired brightness, attached to a coupler at each bundled end, the coupler connected to a light source.

3. A face brightening device for use with vehicles according to claim 1, wherein the face brightening device is a hood ornament comprising a plurality of optical fibers arranged side by side, notched to brighten letters, numbers, patterns or the like, and attached to a coupler, at each bundled end the coupler connected to a light source.

4. A face brightening device for use with vehicles according to claim 1, wherein the face brightening device is a hood ornament comprising a plurality of optical fibers arranged side by side to form a flat area, notched on both sides of said flat area to brighten letters, patterns and the like, and attached to a coupler, said coupler at each bundled end connected to a light source.

5. A face brightening device for use with vehicles according to claim 1, wherein the face brightening device is a hood ornament comprising a plurality of optical fibers arranged side by side to form two layers of flat area, one side of each of the flat area layers being notched to brighten letters, patterns or the like and a reflector plate sandwiched between these flat area layers of the light fibers.

6. A face brightening device for use with vehicles according to claim 1, wherein the face brightening device is an indicator for a transmission change gear lever comprising a plurality of optical fibers arranged side by side, notched to emit light, and attached to a coupler at each bundled end, said fibers attached to the underside of a display housing which is a part of the indicator.

7. A face brightening device for use with vehicles according to claim 1, wherein the face brightening device is an indicator for a transmission change gear lever comprising a plurality of optical fibers arranged side by side, notched to brighten letters on the display housing, and attached to a coupler at each bundled end, the fibers attached to the underside of the display housing which is part of the indicator.

8. A face brightening device for use with vehicles according to claim 1, wherein the face brightening device is applied to the front grill of the vehicle.

9. A face brightening device for use with vehicles according to claim 1, wherein the face brightening device is applied to the rear lights of the vehicle.

10. A face brightening device for use with vehicles according to claim 1, wherein the face brightening device is applied to external garnish elements of the vehicle.

11. A face brightening device for use with vehicles according to claim 1, wherein the face brightening device is a rear panel garnish of the vehicle.

12. A face brightening device for use with vehicles according to claim 11, wherein the optical fibers are connected to a light source at both ends thereof.

* * * * *